United States Patent
Fukuhara (10) Patent No.: US 10,078,288 B2
(45) Date of Patent: Sep. 18, 2018

(54) IMAGE FORMING APPARATUS THAT SCANS PHOTOSENSITIVE MEMBER BY USING ROTATING POLYGONAL MIRROR

(71) Applicant: CANON KABUSHIKI KAISHA, Tokyo (JP)

(72) Inventor: Hiroyuki Fukuhara, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 15/165,938

(22) Filed: May 26, 2016

(65) Prior Publication Data

US 2016/0363883 A1    Dec. 15, 2016

(30) Foreign Application Priority Data

Jun. 10, 2015 (JP) ................................. 2015-117780

(51) Int. Cl.
  *G03G 15/043*   (2006.01)
  *G02B 26/12*   (2006.01)

(52) U.S. Cl.
  CPC ......... *G03G 15/043* (2013.01); *G02B 26/127* (2013.01)

(58) Field of Classification Search
  CPC .......................... G03G 15/043; G02B 26/127
  See application file for complete search history.

(56) References Cited

U.S. PATENT DOCUMENTS

| 7,688,342 | B2 | 3/2010 | Sobue ........................ 347/261 |
| 9,128,291 | B2 | 9/2015 | Nagatoshi et al. .. G02B 26/121 |
| 2015/0241811 | A1* | 8/2015 | Shirahata ............ G03G 15/043 399/51 |
| 2015/0338768 | A1 | 11/2015 | Nagatoshi et al. .. G03G 15/043 |
| 2016/0131896 | A1 | 5/2016 | Nakamura et al. .. G02B 26/121 |

FOREIGN PATENT DOCUMENTS

| JP | 2006-142716 | 6/2006 |
| JP | 2007-078723 | 3/2007 |
| JP | 2007-286129 | 11/2007 |
| JP | 2008-114426 | 5/2008 |
| JP | 2011-148142 | 8/2011 |

OTHER PUBLICATIONS

U.S. Appl. No. 15/040,448, filed Feb. 10, 2016.

* cited by examiner

*Primary Examiner* — David M Gray
*Assistant Examiner* — Andrew V Do
(74) *Attorney, Agent, or Firm* — Fitzpatrick, Cella, Harper & Scinto

(57) ABSTRACT

An image forming apparatus includes: a rotating polygonal mirror having reflection surfaces, and to reflect a luminous flux at each reflection surface so as to scan a photosensitive member; a detection unit configured to detect the luminous flux; a measurement unit configured to measure an interval between time points at which the detection unit detects the luminous flux; a storage unit configured to store correction value data for correcting an image signal for each reflection surface relative to a reference reflection surface; and a specification unit configured to select a characteristic value from among a plurality of values that are obtained from results of measurements, and to specify the reference reflection surface based on the characteristic value. The plurality of values include results of predetermined operations performed on two or more intervals measured by the measurement unit.

10 Claims, 7 Drawing Sheets

IMAGE FORMING APPARATUS THAT SCANS PHOTOSENSITIVE MEMBER BY USING ROTATING POLYGONAL MIRROR

BACKGROUND OF THE INVENTION

Field of the Invention

The present invention relates to an image forming apparatus that scans a scan-target surface by deflecting a luminous flux using a rotating polygonal mirror.

Description of the Related Art

An optical scanning apparatus that is used in an image forming apparatus such as a laser printer scans a photosensitive member by deflecting a luminous flux from a light source using a rotating polygonal mirror of an optical deflector, in order to form a static latent image on the photosensitive member. However, there are cases in which the reflection surfaces of the rotating polygonal mirror have a portion that is not parallel to the rotation axis, i.e., cases in which a so-called plane tilt has occurred, depending on the cutting accuracy at the time the rotating polygonal mirror was manufactured and the attachment accuracy at the time the rotating polygonal mirror was attached to the optical deflector. If deflection scanning is performed with a luminous flux in a situation where a plane tilt has occurred, a phenomenon occurs in which the scanning position of the luminous flux is constantly displaced from the target position. Also, in some cases, the reflection surfaces each have a different curve, depending on the cutting accuracy of each reflection surface. If deflection scanning is performed with a luminous flux in this situation, so-called jitter occurs in the main scanning direction, which is a phenomenon in which the scanning position of the luminous flux on each reflection surface is constantly displaced from the target position. Although it is possible to solve these phenomena by increasing the cutting accuracy of the rotating polygonal mirror, this solution increases the processing cost.

For this reason, Japanese Patent Laid-Open No. 2007-286129 discloses a configuration in which the reflection surfaces of the rotating polygonal mirror are specified and variations in the scanning line interval are electrically corrected. According to Japanese Patent Laid-Open No. 2007-286129, a magnet is attached to a lower portion of a reflection surface of the rotating polygonal mirror, and the reflection surface is specified using a Hall element that is located below the rotating polygonal mirror. Also, Japanese Patent Laid-Open No. 2007-078723 discloses a configuration in which a reflection surface of the rotating polygonal mirror is specified based on the phase relationship between a synchronization signal used for writing start position control and a rotation angle signal used for rotation control of the rotating polygonal mirror.

According to the configuration disclosed in Japanese Patent Laid-Open No. 2007-286129, it is necessary to provide a magnet, a Hall element, and so on for the rotating polygonal mirror, and the cost is high. According to the configuration disclosed in Japanese Patent Laid-Open No. 2007-078723, it is not possible to uniquely specify the reflection surfaces until the number of synchronization signals and the number of rotation angle signals that are detected during one rotation of the rotating polygonal mirror are relatively prime.

SUMMARY OF THE INVENTION

According to an aspect of the present invention, an image forming apparatus includes: a photosensitive member; a light source configured to emit a luminous flux according to an image signal; a rotating polygonal mirror having a plurality of reflection surfaces, and configured to be driven to rotate, and to reflect the luminous flux emitted from the light source at each of the plurality of reflection surfaces so as to scan the photosensitive member; a detection unit configured to detect the luminous flux that has been reflected by the rotating polygonal mirror in a predetermined direction; a measurement unit configured to measure, in order of time, an interval between time points at which the detection unit detects the luminous flux, during at least one rotation of the rotating polygonal mirror; a storage unit configured to store pieces of correction value data for correcting the image signal for each of the plurality of reflection surfaces relative to a reference reflection surface that is one of the plurality of reflection surfaces; and a specification unit configured to select a characteristic value from among a plurality of values that are obtained from results of measurements performed by the measurement unit, and to specify the reference reflection surface based on the characteristic value thus selected. The plurality of values obtained from the results of the measurements performed by the measurement unit include results of predetermined operations performed on two or more intervals measured by the measurement unit.

Further features of the present invention will become apparent from the following description of exemplary embodiments with reference to the attached drawings.

DESCRIPTION OF THE EMBODIMENTS

Illustrative embodiments of the present invention will be described below with reference to the drawings. Note that the following embodiments are illustrative, and the scope of the present invention is not intended to be limited to the content of the embodiments. Also, constituent elements not essential to the description of the embodiments are not shown in the drawings referenced below.

First Embodiment

Figure 1:
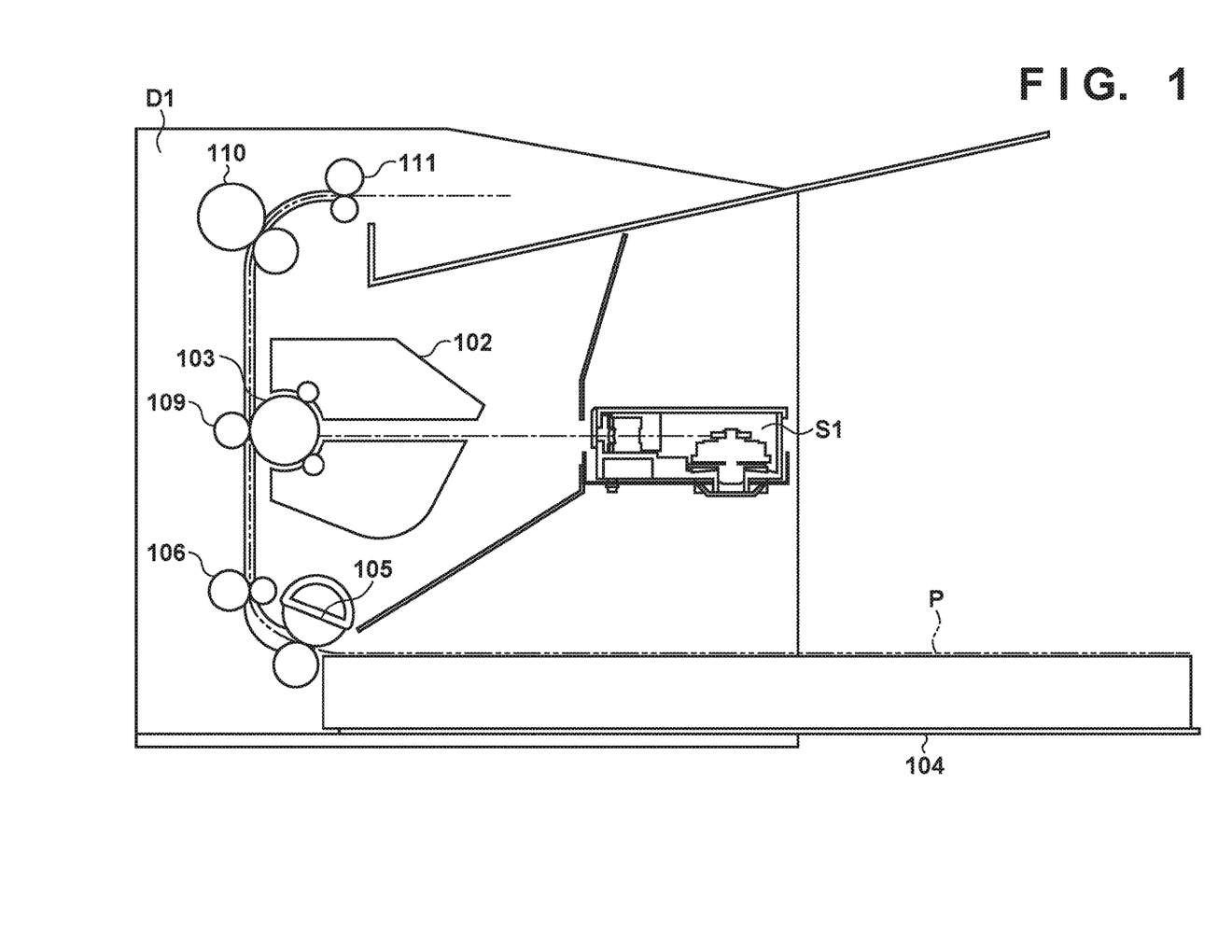
FIG. 1 is a schematic diagram showing a configuration of an image forming apparatus according to one embodiment.

FIG. 1 is a schematic diagram showing a configuration of an image forming apparatus D1 according to the present embodiment. The image forming apparatus D1 is provided with an optical scanning apparatus S1, and scans and exposes a photosensitive member 103, which is an image carrier, by using the optical scanning apparatus S1, and thus forms an electrostatic latent image on the photosensitive member 103. Note that, before the electrostatic latent image is formed, the photosensitive member 103 has been charged to a predetermined electric potential by a charging unit that is built into a process cartridge 102. The electrostatic latent image on the photosensitive member 103 is developed by a developing unit that is built into the process cartridge 102, and is visualized as a developer image. Meanwhile, recording materials P, which are stored in a cassette 104, are separated and fed one by one by a feeding roller 105, and are conveyed further downstream by a conveyance roller 106. A transfer roller 109 transfers the developer image formed on the photosensitive member 103 onto the recording materials P. After the developer image is transferred, the recording materials P are conveyed further downstream, and the developer image is fixed to the recording materials P by a fixing unit 110. Thereafter, the recording materials P are discharged by a discharge roller 111 to the outside of the image forming apparatus D1.

Figure 2:
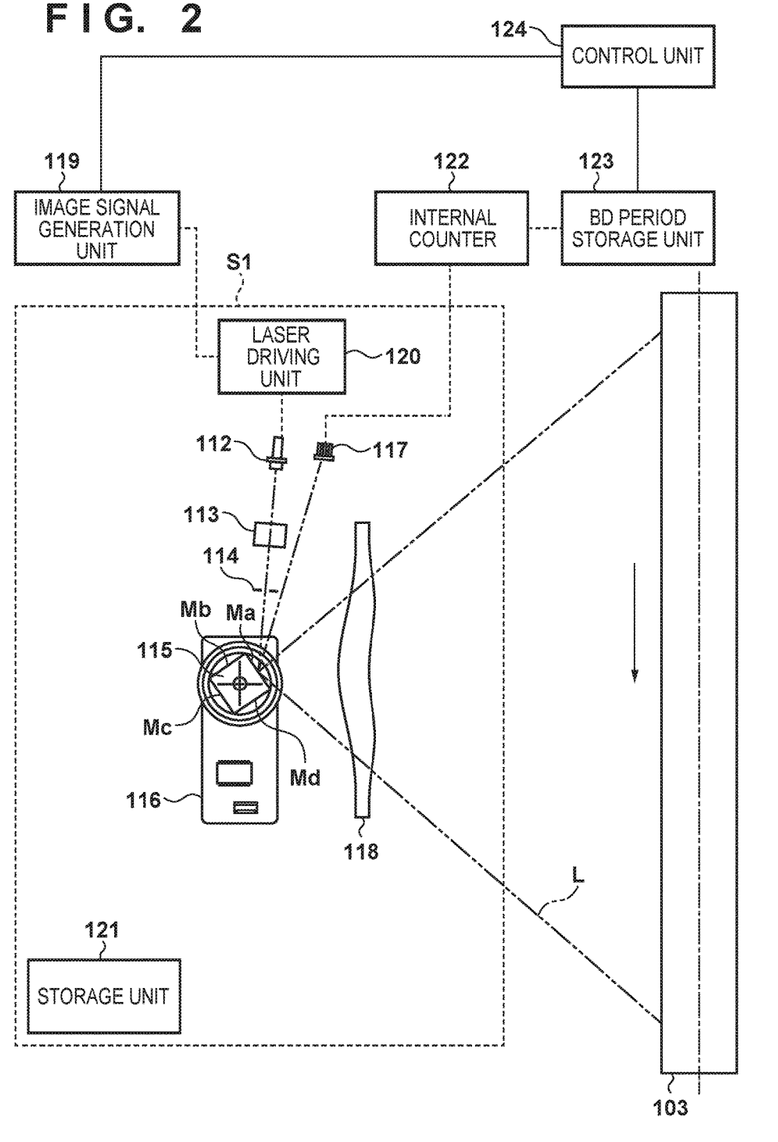
FIG. 2 is a diagram showing a configuration of an optical scanning apparatus according to one embodiment.

FIG. 2 is a diagram showing the configurations of the optical scanning apparatus S1 and the peripheral circuits thereof according to the present embodiment. A control unit 124 performs overall control of the image forming apparatus D1. An image signal generation unit 119 outputs an image signal corresponding to an image that is to be formed, to a laser driving unit 120. The laser driving unit 120 drives a light source 112 based on an input image signal, and outputs a luminous flux L that has been modulated according to the image signal. The luminous flux L emitted by the light source 112 is converted by a compound anamorphic collimator lens 113 into approximately convergent light within a horizontal scanning cross section, and into convergent light within a vertical scanning cross section. Subsequently, the luminous flux width of the luminous flux L is restricted by an aperture stop 114, and the luminous flux L forms an approximately line-shaped image (a line-shaped image elongated in the main scanning direction) on a reflection surface of the rotating polygonal mirror 115 of an optical deflector 116. Note that it is assumed that the rotating polygonal mirror 115 in the present embodiment has four reflection surfaces, namely reflection surfaces Ma to Md. The luminous flux L is reflected by any one of the reflection surfaces Ma to Md of the rotating polygonal mirror 115. The deflection scanning is performed with the luminous flux L by rotating the rotating polygonal mirror 115. The luminous flux L reflected by the rotating polygonal mirror 115 enters a synchronization signal detection sensor (hereinafter referred to as "BD sensor") 117, depending on the reflection direction. The BD sensor 117 outputs a synchronization signal (hereinafter referred to as "BD signal") according to the light-reception status with respect to the luminous flux L. In the present embodiment, it is assumed that the BD signal indicates "HIGH" while the BD sensor 117 is not receiving the luminous flux L, and indicates "LOW" while the BD sensor 117 is receiving the luminous flux L. An internal counter 122 detects the time point at which the BD signal becomes LOW as a reference time point for determining a writing start position on the photosensitive member 103 in the main scanning direction, measures intervals between detected reference time points (hereinafter referred to as "BD period"), and stores the intervals in a BD period storage unit 123 in order of time. The luminous flux L enters an fθ lens 118, depending on the reflection direction. The fθ lens 118 is designed such that the luminous flux L converges and forms a spot on the photosensitive member 103, and the scanning speed with the spot on the photosensitive member 103 is uniform. The luminous flux L that has passed through the fθ lens 118 is utilized to scan and expose the photosensitive member 103.

The rotating polygonal mirror 115 rotates, and thus main scanning on the photosensitive member 103 is performed with the luminous flux L. Also, the photosensitive member 103 is driven to rotate when an image is to be formed, and accordingly the surface of the photosensitive member 103 moves in a direction that is orthogonal to the main scanning direction. An electrostatic latent image is formed on the surface of the photosensitive member 103 by repeatedly performing main scanning while rotating the photosensitive member 103. Here, correction value data based on the properties of the individual product has been stored in a storage unit 121 of the optical scanning apparatus S1 in advance. For example, a configuration may be adopted in which the correction value data is stored in the storage unit 121 at the time of shipping from the factory. The correction value data are data that indicates, for each reflection surface of the rotating polygonal mirror 115, an image signal correction value that is to be used when the photosensitive member 103 is scanned. In other words, when generating an image signal for driving the light source 112, the image signal generation unit 119 corrects the original image signal by using the piece of correction value data that is related to the reflection surface that is to be used for scanning on the photosensitive member 103. The influence of a plane tilt and jitter is thus suppressed.

Also, information that indicates a reference reflection surface of the optical scanning apparatus S1 has been stored in the storage unit 121 in advance. The information indicating the reference reflection surface is information that specifies one reflection surface out of the reflection surfaces. As described below, the image forming apparatus specifies the reference reflection surface by measuring the actual BD period when forming an image. The pieces of correction value data are respectively associated with the reflection surfaces by specifying the reference reflection surface. Specifically, in this example, deflection scanning with the luminous flux L is performed by using the reflection surfaces in the order of Ma, Mb, Mc, Md, Ma, and so on. Information indicating that the reference reflection surface is the reflection surface Ma, and the pieces of correction value data, have been stored in the storage unit 121 in advance. The pieces of correction value data are arranged in order in which their corresponding reflection surfaces are used for reflection, beginning with the piece that corresponds to the reference reflection surface Ma, i.e., the order of Ma, Mb, Mc, and Md. The control unit 124 specifies the reference reflection surface Ma by measuring the actual BD period. In this case, the image signal generation unit 119 corrects the image signal for the reference reflection surface by using the first piece of the correction value data. The image signal generation unit 119 makes a correction for the reflection surface after the reference reflection surface by using the second piece of correction value data. Instead of providing the storage unit 121 in the optical scanning apparatus S1, it is possible to adopt a configuration in which a two-dimensional barcode or the like, on which the pieces of correction value data and the information specifying the reference reflection surface have been recorded, is attached to the optical scanning apparatus S1. If this is the case, when the optical scanning apparatus S1 is built into the image forming apparatus D1, information is written to an information storage unit of the image forming apparatus D1, which is not shown in the drawings, by using a barcode reader. In other words, a configuration may be adopted in which the pieces of correction value data and the information indicating the reference reflection surface are stored in the image forming apparatus D1 at the last moment, instead of having been stored in the optical scanning apparatus S1 in advance.

Figure 3:
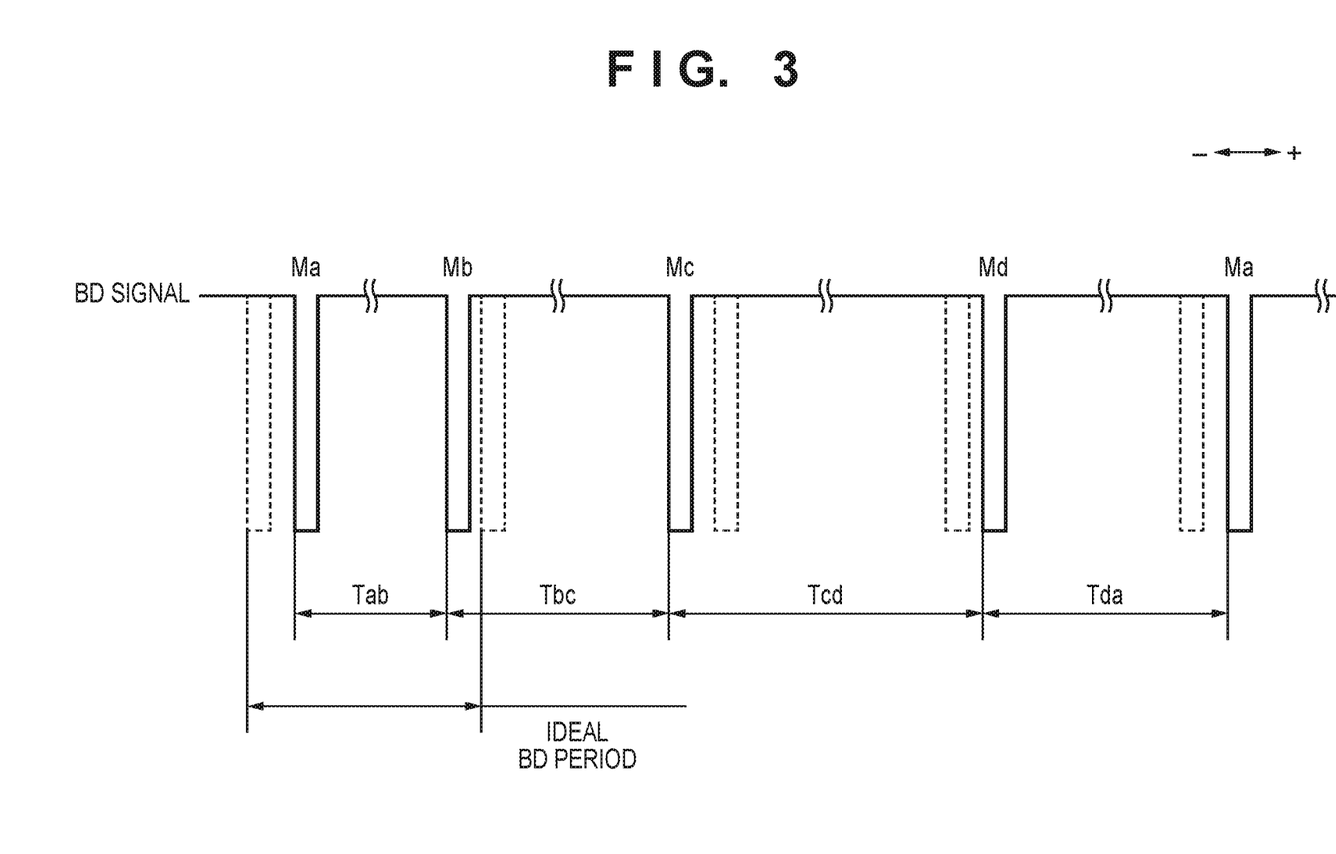
FIG. 3 is a diagram showing a waveform of a BD signal according to one embodiment.
Figure 4:
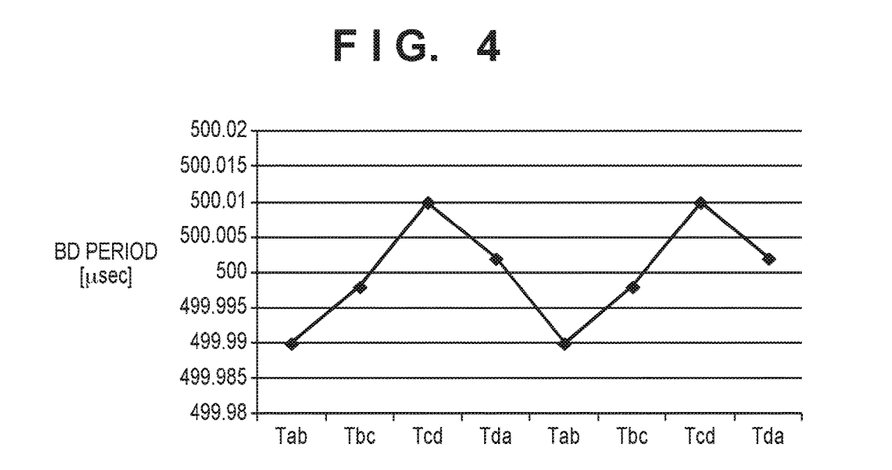
FIG. 4 is a diagram showing an example of a BD period according to one embodiment.
Figure 5:
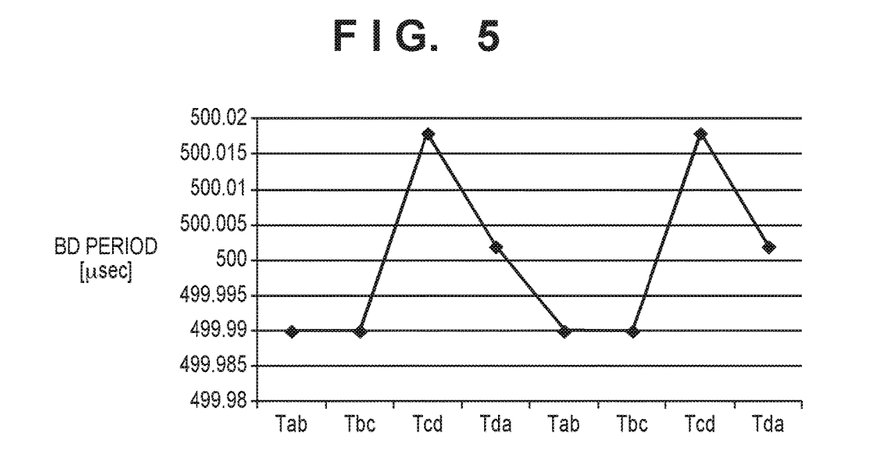
FIG. 5 is a diagram showing an example of a BD period according to one embodiment.

FIG. 3 shows an example of the BD signal. Note that, in FIG. 3, the dotted line shows the BD signal in the case where the reflection surfaces of the rotating polygonal mirror 115 are ideal. In the example shown in FIG. 3, the luminous flux L reflected by the reflection surfaces Ma and Md enters the BD sensor 117 at a time point that is later than under ideal conditions. In contrast, the luminous flux reflected by the reflection surfaces Mb and Mc enters the BD sensor 117 at a time point that is earlier than in the case of being reflected under ideal conditions. In the example shown in FIG. 3, BD periods Tab, Tbc, Tcd, and Tda satisfy the relationship Tab<Tbc<Tda<Tcd. Note that Tab is the BD period from when the luminous flux L reflected by the reflection surface Ma enters the BD sensor 117 to when the luminous flux L reflected by the reflection surface Mb enters the BD sensor 117, that is to say, the BD period corresponding to the reflection surface Ma and the reflection surface Mb. The same applies to the other BD periods Tbc, Tcd, and Tda. FIG. 4 is a graph showing this relationship. FIGS. 5 to 8 show other examples of the BD period.

Figure 6:
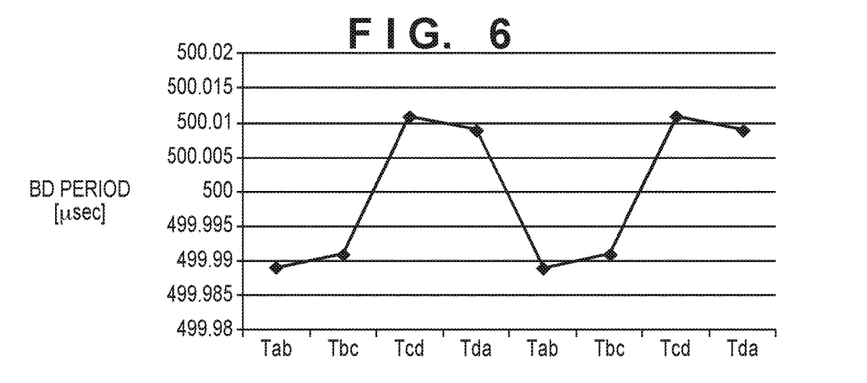
FIG. 6 is a diagram showing an example of a BD period according to one embodiment.

For example, depending on differences between the BD periods, it can be possible to specify the reflection surface that is reflecting the luminous flux by detecting the minimum BD period or the maximum BD period. However, as shown in FIG. 6, if the difference between the shortest BD period Tab and the second shortest BD period Tbc, or the difference between the longest BD period Tcd and the second longest BD period Tda is small, it can be impossible to detect the difference, depending on the BD period detection resolution. However, even in such cases, it is possible to specify the reflection surface by obtaining the difference between each pair of successive BD periods and determining the maximum difference.

Figure 9:
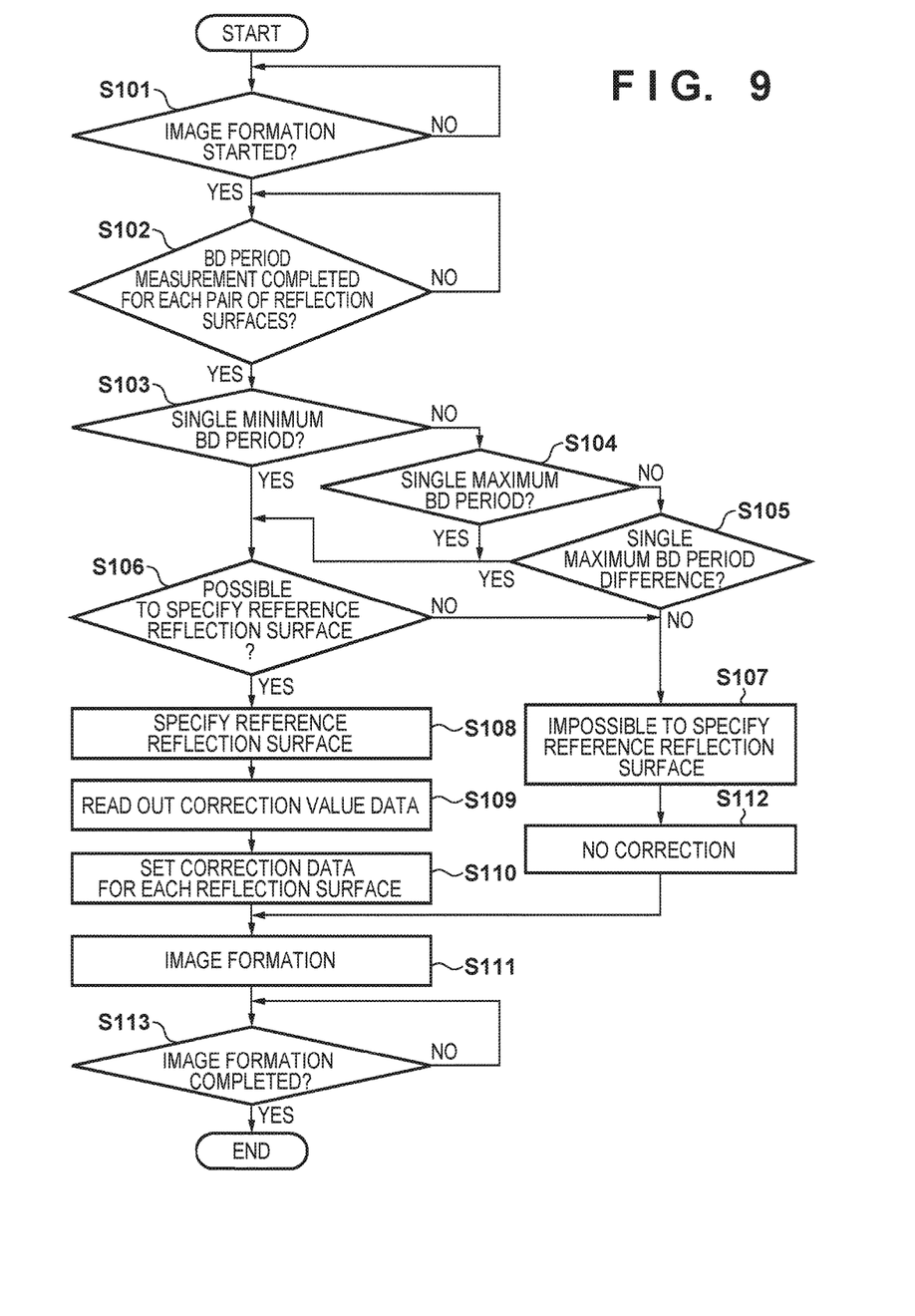
FIG. 9 is a flowchart showing image forming processes according to one embodiment.

FIG. 9 is a flowchart showing image forming processes according to the present embodiment. The flowchart shown in FIG. 9 includes a reflection surface specification process that is performed during the image forming processes. Upon image formation being started in step S101, the optical deflector 116 is driven. Consequently, the luminous flux L with which deflection scanning has been performed using the rotating polygonal mirror 115 is input to the BD sensor 117. The internal counter 122 sequentially stores BD periods to the BD period storage unit 123. In step S102, the control unit 124 waits until a BD period is measured at least once for each pair of reflection surfaces. In other words, the BD period measurement is performed during at least one rotation of the rotating polygonal mirror 115. Upon completion of the BD period measurement, the control unit 124 determines, in step S103, whether or not there is only one minimum BD period. For example, if the measured BD periods are those shown in FIG. 4, there is only one minimum BD period, namely the BD period Tab, and step S106 is performed next. In contrast, in the following, it is assumed that the measured BD periods are those shown in FIG. 5. In the example shown in FIG. 5, the fact is that the minimum BD period is the BD period Tbc, and the second shortest BD period is the BD period Tab. However, the difference between the BD period Tbc and the BD period Tab is smaller than the BD period detection resolution, and therefore the control unit 124 detects the BD periods Tab and Tbc as the same values. In other words, in the example shown in FIG. 5, there are two minimum BD periods.

Therefore, step S104 is performed next in this case. In step S104, the control unit 124 determines whether or not there is only one maximum BD period. For example, in the example shown in FIG. 5, there is only one maximum BD period, namely the BD period Tcd, and step S106 is performed next in this case.

In contrast, in the following, it is assumed that the measured BD periods are those shown in FIG. 6. Note that, in FIG. 6, the difference between the BD periods Tab and Tbc and the difference between the BD period Tcd and Tda are small, and it is assumed that the control unit 124 detects the BD periods Tab and Tbc as the same values and the BD periods Tcd and Tda as the same values. In this case, "NO" is applicable to both steps S103 and S104, and step S105 is performed next. In step S105, the control unit 124 calculates the difference between BD periods (hereinafter referred to as "BD period difference) that are adjacent each other in terms of time, and determines whether or not there is only one maximum BD period difference. For example, in the example shown in FIG. 6, the maximum BD period difference is the period difference between the BD period Tda and the BD period Tab, and the value of the difference is Tda−Tab=0.019 μsec. The period difference between the BD period Tbc and the BD period Tcd is Tbc−Tcd=−0.019 μsec. Although these period differences have the same absolute value, it is possible to distinguish these differences from each other because their signs are different. If it is determined in step S105 that there is only one maximum BD period difference, step S106 is performed next.

In step S106, the control unit 124 determines whether or not it is possible to specify the reference reflection surface. Note that a configuration may be adopted in which the process in step S106 is omitted, and if "YES" is applicable to any of steps S103 to S105, step S108 is performed and the reference reflection surface is specified. First, a description is given of the reference reflection surface specification process performed in step S108. In the present embodiment, the method for specifying the reference reflection surface has been determined in advance according to which process, out of steps S103 to S105, is "YES". It is assumed here that this specification method is the same as the method for specifying the reference reflection surface that is indicated by the information stored in the storage unit 121. For example, if step S103 is "YES" as in the example shown in FIG. 4, the reflection surface Ma, which is the preceding reflection surface in terms of time, out of the reflection surfaces corresponding to the minimum BD period Tab, can be specified as the reference reflection surface. If this is the case, it is determined, at the time of manufacturing, that it is possible to specify the reference reflection surface based on the minimum BD period by a measurement performed when information is stored in the storage unit 121. Therefore, the information indicating that the reflection surface Ma is the reference reflection surface is stored in the storage unit 121 at that time. In cases where it is possible to specify the reference reflection surface based on the maximum BD period, such as the case in which step S104 is "YES" as in the example shown in FIG. 5, the preceding reflection surface in terms of time, out of the reflection surfaces corresponding to the maximum BD period, is specified as the reference reflection surface. In other words, in the example shown in FIG. 5, the reflection surface Mc is specified as the reference reflection surface. In this case, of course, information resulting from a measurement performed in advance, indicating that the reflection surface Mc is the reference reflection surface, is stored in the storage unit 121. In the case where step S105 is "YES" as in the example shown in FIG. 6, the preceding reflection surface in terms of time out of the reflection surfaces corresponding to the preceding BD period in terms of time out of the BD periods corresponding to the maximum BD period difference can be specified as the reference reflection surface. In other words, in the example shown in FIG. 6, the reflection surface Md is specified as the reference reflection surface. Note that other criteria may be used for specifying the reference reflection surface.

Also note that the process in step S106 is performed to determine that it is impossible to specify the reference reflection surface if it has been separately determined that, for example, a large amount of disturbance, noise, and the like, which serve as additional criteria, occurred at the time of measurement. Upon the control unit 124 specifying the reference reflection surface in step S108, the image signal generation unit 119 reads out the pieces of correction value data from the storage unit 121 in step S109, determines the correspondence relationship between the pieces of correction value data and the reflection surfaces in step S110, and corrects the image signal, for each reflection surface, and forms an image, in step S111. The processes are complete if it is determined that image formation is complete in step S113.

Figure 7:
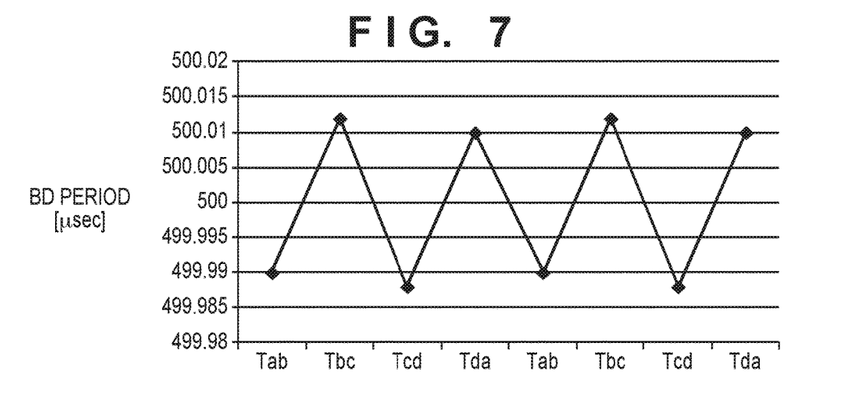
FIG. 7 is a diagram showing an example of a BD period according to one embodiment.
Figure 8:
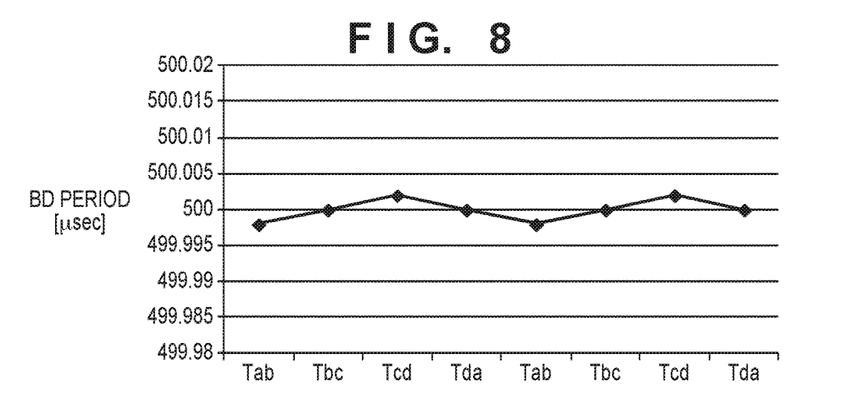
FIG. 8 is a diagram showing an example of a BD period according to one embodiment.

Meanwhile, if "NO" is applicable to all of steps S103 to S105 as in cases where the BD periods are those shown in FIG. 7 and FIG. 8, the control unit 124 determines in step S107 that it is impossible to specify the reference reflection surface. The same applies to the case where it is determined in step S106 that it is impossible to specify the reference reflection surface, based on the additional conditions. If this is the case, the control unit 124 determines in step S112 that image formation is to be performed without image signal correction that is based on the correction value data. This is because image signal correction performed with a piece of correction value data for a reflection surface other than the reflection surface in use instead degrades the image quality.

Note that the measurement of BD periods performed in step S102 may be performed a plurality of times for each BD period, and the average may be used. Consequently, it is possible to reduce the probability of a measurement error occurring due to disturbance factors such as noise. Also, in the case where the BD periods are measured a plurality of times, a configuration may be adopted in which the BD periods are measured a predetermined number of times and the average is obtained, and measurement is complete when the variation in the average that is obtained by subsequent measurements, from the previous average, is no greater than a threshold value.

Also, the order of steps S103 to S105 is not limited to the order shown in FIG. 9. For example, a configuration may be adopted in which whether or not there is only one maximum BD period is determined first. Furthermore, a configuration may be adopted in which, in the process performed in step S105, the sum of BD periods that are adjacent to each other in terms of time is calculated instead of the difference between BD periods that are adjacent to each other in terms of time. Furthermore, in the process performed in step S105, the minimum value may be used instead of the maximum value. Furthermore, in the process performed in step S105, the sum or the difference may be calculated with respect to the BD period Tab and the BD period Tcd, for example, instead of BD periods that are adjacent to each other in terms of time. In other words, any configuration may be adopted as long as it can be determined whether or not there is only one maximum value or minimum value obtained from a plurality of BD periods having a predetermined relationship in terms of time.

Also, a configuration may be adopted in which, if it has been determined in steps S103 and S104 that there is not only one minimum or maximum BD period, it is determined in step S107 that the reference reflection surface cannot be specified, without performing the determination based on the BD period difference in step S105. Also, a configuration may be adopted in which steps S103 and S104 are omitted, and whether or not there is only one maximum BD period difference is determined in step S105, and if there is not only one maximum BD period, it is then determined in step S107 that the reference reflection surface cannot be specified. In other words, a configuration may be adopted in which whether or not the reference reflection surface can be specified is not determined based on all of steps S103 to S105, but based on one or two values selected from among steps S103 to S105.

As described above, according to the present embodiment, the luminous flux reflected by the rotating polygonal mirror 115 in a predetermined direction is detected by the BD sensor 117. Then, the internal counter 122 measures the interval between the time points at which the luminous flux is detected, for each pair of reflection surfaces in order of time, and stores the measured intervals in the BD period storage unit 123. Also, correction value data for image signal for each reflection surface, relative to the reference reflection surface out of the plurality of reflection surfaces, has been stored in the storage unit 121 in advance. The control unit 124 functions as a specification unit that selects a characteristic value from among a plurality of values that are obtained from the results of the measurements performed by the internal counter 122, and specifies the reference reflection surface based on the selected characteristic value. Here, the plurality of values that are obtained from the measurement results include at least the measured reflection surface interval or the results of predetermined operations performed on two or more intervals.

For example, a configuration may be adopted in which the plurality of values obtained from the measurement results include either one or both of the minimum interval and the maximum interval. Also, a configuration may be adopted in which the results of operations performed on two or more intervals include a value that is based on the difference between, or the sum of, two or more intervals having a predetermined relationship in terms of time. Also, a configuration may be adopted in which the results of operations performed on two or more intervals include the maximum value or the minimum value of the difference between, or the sum of, two or more intervals having a predetermined relationship in terms of time. Furthermore, the two or more intervals having a predetermined relationship in terms of time may be two intervals that are adjacent to each other in terms of time. The control unit 124 can select whichever of the minimum interval, the maximum interval, or a result of the predetermined operations performed on two or more intervals has only one value, as the characteristic value.

Second Embodiment

Next, a description is given of a second embodiment, mainly of differences from the first embodiment. In the first embodiment, as shown in FIG. 9, in the process in step S103, it is determined whether or not it is possible to specify the reference reflection surface, and if it is not possible, the process in step S104 is performed, and if it is not possible to specify the reference reflection surface even by performing the process in step S104, the process in step S105 is performed, sequentially. In the present embodiment, information indicating, from among steps S103 to S105 shown in FIG. 9, the step in which the reference reflection surface is to be specified, has been stored in the storage unit 121 in advance. Specifically, in the example shown in FIG. 4, information indicating that the reference reflection information is to be specified based on the minimum BD period, has been stored in the storage unit 121 in advance, and in the example shown in FIG. 5, information indicating that the reference reflection information is to be specified based on the maximum BD period has been stored in the storage unit 121 in advance, for example.

Figure 10:
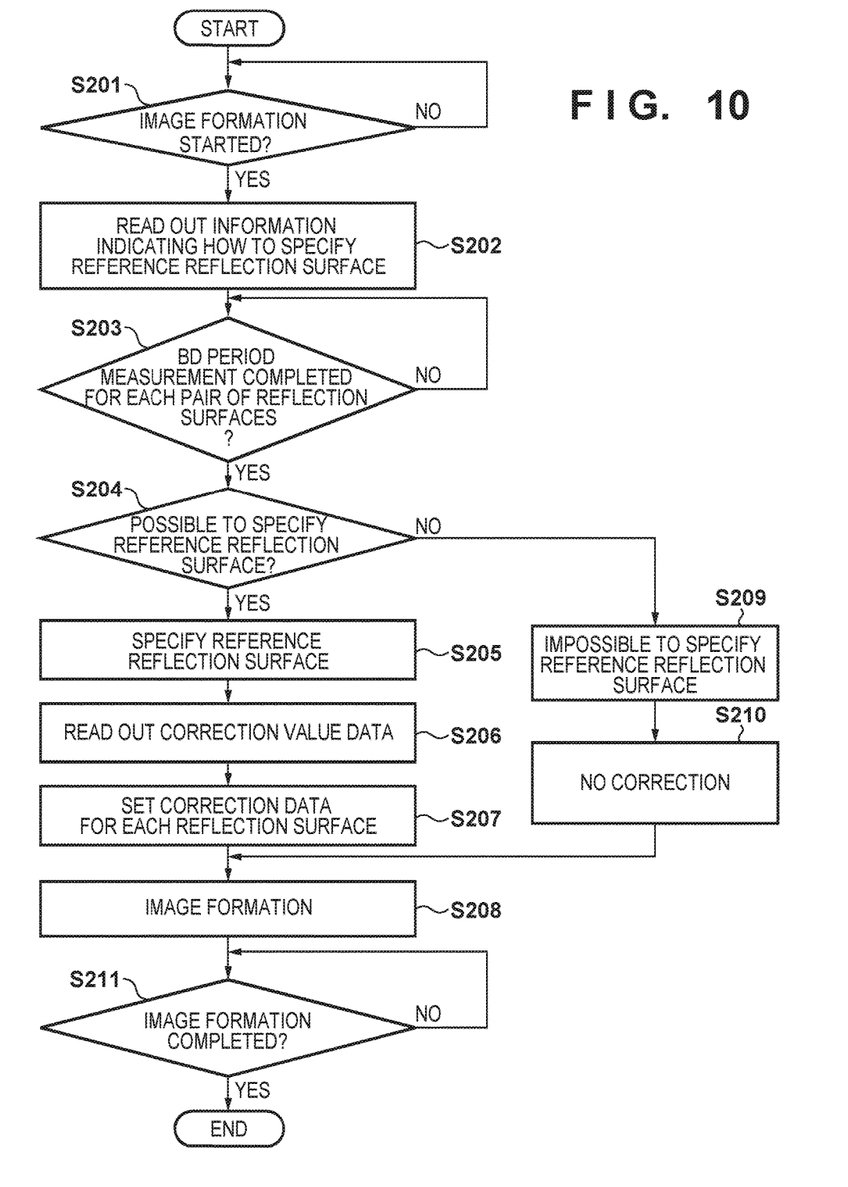
FIG. 10 is a flowchart showing image forming processes according to one embodiment.

FIG. 10 is a flowchart showing image forming processes according to the present embodiment. Upon image forming being started in step S201, the optical deflector 116 is driven, and the luminous flux L with which deflection scanning has been performed using the rotating polygonal mirror 115 is input to the BD sensor 117. Consequently, BD periods are sequentially stored in the BD period storage unit 123. In step S202, the control unit 124 reads out the information indicating how to specify the reference reflection surface, from the storage unit 121. In step S203, the control unit 124 waits until the BD period measurement for each pair of reflection surfaces is complete. Upon completion of the BD period measurement for each pair of reflection surfaces, the control unit 124 determines, in step S204, whether or not it is possible to specify the reference reflection surface by using the reference reflection surface specification method indicated by the information read out in step S202. The subsequent processes are the same as those in the first embodiment, and the description thereof is not repeated here.

As described above, in the present embodiment, information indicating the value with which the reference reflection surface is to be specified, i.e., information indicating how to obtain the characteristic value, has been stored in the storage unit 121 in advance. Therefore, it is possible to reduce the time required for specifying the reflection surfaces.

Note that although the image forming apparatus D1 shown in FIG. 1 is a monochrome image forming apparatus, the present invention is applicable to color image forming apparatuses as well. In the case of a color image forming apparatus, the scanning line displacements respectively corresponding to the reflection surfaces are often the same for each color or have a predetermined relationship with each color, and in such cases, the same correction value data may be used for each color. Note that if there are no correlations among the colors in terms of the scanning line displacements respectively corresponding to the reflection surfaces, correction value data may be stored in the storage unit 121 for each color in advance. Also, the number of surfaces of the rotating polygonal mirror 115 is not limited to four, and may be any number. As described above, according to the present embodiment, it is possible to specify the reflection surfaces of the rotating polygonal mirror by using a simple configuration.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-117780, filed on Jun. 10, 2015, which is hereby incorporated by reference herein in its entirety.

What is claimed is:

1. An image forming apparatus, comprising:
a photosensitive member;
a light source configured to emit a luminous flux according to an image signal;
a rotating polygonal mirror having a plurality of reflection surfaces, and configured to be driven to rotate, and to reflect the luminous flux emitted from the light source at each of the plurality of reflection surfaces so as to scan the photosensitive member;
a detection unit configured to detect the luminous flux that has been reflected by the rotating polygonal mirror in a predetermined direction;
a measurement unit configured to measure, in order of time, an interval between time points at which the detection unit detects the luminous flux, during at least one rotation of the rotating polygonal mirror;
a storage unit configured to store pieces of correction value data for correcting the image signal for each of the plurality of reflection surfaces relative to a reference reflection surface that is one of the plurality of reflection surfaces; and
a specification unit configured to obtain a plurality of calculated values by repeatedly selecting two intervals from among a plurality of intervals measured by the measurement unit and by performing a predetermined operation on the two intervals, the specification unit further being configured to select a characteristic value from among the plurality of calculated values, and to specify the reference reflection surface based on the characteristic value.

2. The image forming apparatus according to claim 1, wherein the predetermined operation of the two intervals includes calculating a difference between the two intervals, or calculating a sum of the two intervals, the two intervals having a predetermined relationship in terms of time.

3. The image forming apparatus according to claim 2, wherein the characteristic value is a maximum value or a minimum value of the plurality of calculated values.

4. The image forming apparatus according to claim 2, wherein the two intervals having the predetermined relationship in terms of time are two intervals that are adjacent to each other in terms of time.

5. The image forming apparatus according to claim 1, wherein the specification unit is further configured to select a value different from all other values among the plurality of calculated values as the characteristic value.

6. The image forming apparatus according to claim 1, further comprising a generation unit configured to generate the image signal by determining a correspondence relationship between the pieces of correction value data stored in the storage unit and the plurality of reflection surfaces, based on the reference reflection surface specified by the specification unit.

7. An image forming apparatus, comprising:
a photosensitive member;
a light source configured to emit a luminous flux according to an image signal;
a rotating polygonal mirror having a plurality of reflection surfaces, and configured to be driven to rotate, and to reflect the luminous flux emitted from the light source at each of the plurality of reflection surfaces so as to scan the photosensitive member;
a detection unit configured to detect the luminous flux that has been reflected by the rotating polygonal mirror in a predetermined direction;
a measurement unit configured to measure, in order of time, an interval between time points at which the detection unit detects the luminous flux at least while the rotating polygonal mirror rotates once;
a storage unit configured to store pieces of correction value data for correcting the image signal for each of the plurality of reflection surfaces relative to a reference reflection surface that is one of the plurality of reflection surfaces, and information indicating a way to obtain a characteristic value for specifying the reference reflection surface; and
a specification unit configured to, based on the information stored in the storage unit, select whether to obtain the characteristic value by comparing a plurality of intervals measured by the measurement unit or to obtain the characteristic value by repeatedly performing a predetermined operation on a plurality of selections of two intervals so as to obtain a plurality of calculated values and by selecting the characteristic value from among the plurality of calculated values, the specification unit further being configured to specify the reference reflection surface based on the characteristic value.

8. The image forming apparatus according to claim 7, wherein the predetermined operation includes a difference between, or a sum of, two intervals, the two intervals having a predetermined relationship in terms of time.

9. The image forming apparatus according to claim 8, wherein the two intervals having the predetermined relationship in terms of time are two intervals that are adjacent to each other in terms of time.

10. The image forming apparatus according to claim 7, further comprising a generation unit configured to generate the image signal by determining a correspondence relationship between the pieces of correction value data stored in the storage unit and the plurality of reflection surfaces, based on the reference reflection surface specified by the specification unit.

* * * * *